United States Patent [19]

Bauser

[11] Patent Number: 5,434,401
[45] Date of Patent: Jul. 18, 1995

[54] SIGNAL COUPLER

[75] Inventor: Philippe B. Bauser, Ornex, France

[73] Assignee: Motorola, Inc., Schaumburg, Ill.

[21] Appl. No.: 233,097

[22] Filed: Apr. 25, 1994

[30] Foreign Application Priority Data

May 21, 1993 [GB] United Kingdom ............... 9310639

[51] Int. Cl.6 ............................ G06K 7/10; G06K 7/14
[52] U.S. Cl. ..................................... 235/454; 235/472; 235/380
[58] Field of Search ........................ 235/454, 472, 380; 257/84

[56] References Cited

U.S. PATENT DOCUMENTS 4,575,621  3/1986  Dreifus .
4,783,598  11/1988 McAdams .
4,916,296  4/1990  Streck .
5,349,210  9/1994  Ackley et al. ....................... 235/472

FOREIGN PATENT DOCUMENTS 0265827  10/1987  European Pat. Off. .

Primary Examiner—Harold Pitts
Attorney, Agent, or Firm—Gary W. Hoshizaki

[57] ABSTRACT

A signal coupler for incorporating in a smartcard or a base device comprises an optocoupling arrangement for exchanging power or data signals between the demountable device and the base device, thereby eliminating problems associated with wear of metal contacts and allowing convenient manufacture.

6 Claims, 1 Drawing Sheet

SIGNAL COUPLER

FIELD OF THE INVENTION

This invention relates generally to signal couplers.

BACKGROUND OF THE INVENTION

Conventionally, signal couplers are used in demountable electronic devices such as smart cards. Smart cards are credit card size devices containing an integrated circuit, and in use are arranged to communicate to a base device through a signal coupler which provides an electrical connection for the flow of supply current and/or data signals between the base device and the integrated circuit of the smart card.

A problem with this arrangement is that in normal use, the contacts may become worn, thereby not efficiently transmitting the power supply or the data signals between the base device and the demountable device. Functionality of the circuit within the device may thereby be impaired or lost.

It is known to use an inductive connection composed of two inductive coils which do not require physical contact. However, very close proximity between the two coils is necessary for good functionality with this arrangement.

Furthermore, the coil of the device cannot easily be integrated with the circuit thereof, thereby placing a constraint on the minimum size of the device and convenience of manufacture.

This invention seeks to provide a signal coupler in which the above mentioned disadvantages have been mitigated.

SUMMARY OF THE INVENTION

It is an object of the present invention to provide a signal coupler for incorporating in a predetermined one of a demountable device and a base device, comprising an optocoupling arrangement for exchanging optical signals between the demountable device and the base device, the two devices being in proximity to each other.

The optocoupling arrangement provides a non-contact conductive path between the demountable device and the base device.

The optocoupling arrangement may comprise at least one photovoltaic generator.

To advantage, when incorporated in the demountable device, the at least one photovoltaic generator may be fabricated by epitaxial growth from a semiconductor wafer incorporated in the demountable device.

The signal coupler may be arranged to transfer data or power signals through the conductive path between the demountable device and the base device.

Alternatively, the signal coupler may be arranged to transfer a combined data and power signal through the conductive path between the demountable device and the base device.

Further, the demountable device may be a smartcard.

In this way, the wearing of metal contacts is avoided and functionality of a circuit within the demountable device is preserved whilst not impairing the minimum size of the device or convenience of manufacture.

BRIEF DESCRIPTION OF DRAWINGS

An exemplary embodiment of the invention will now be described with reference to the drawing in which.

DETAILED DESCRIPTION OF A PREFERRED EMBODIMENT

Figure 1:
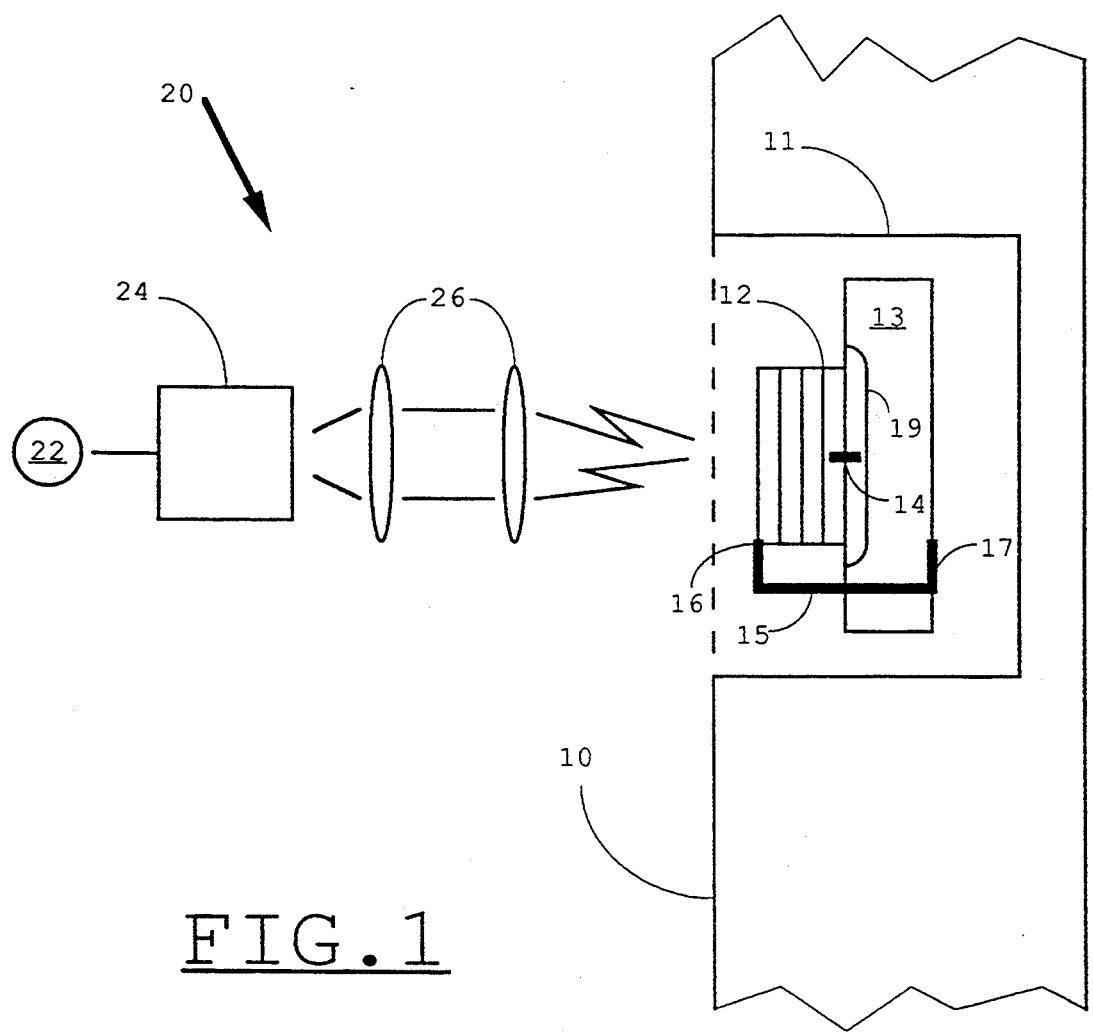
FIG. 1 shows a preferred embodiment of a signal coupler in accordance with the invention.

Referring to FIG. 1, there is shown a carrier member 10 of a smart card. Within the carrier member 10 there is a recess 11 containing a signal coupler comprising a series of photovoltaic generators 12 and a semiconductor substrate 13 containing a microcontroller 19. The microcontroller 19 is formed within the substrate by a well known semiconductor deposition process.

The photovoltaic generators 12 are fabricated by epitaxial growth from the semiconductor substrate 13 incorporating the microcontroller 19, such that the overall area of the combined arrangement of the substrate 13 and photovoltaic generators 14 is small and can be easily engineered in the recess 11 of the carrier member 10.

At least two conductive paths, a negative path 14 and a positive path 15 are required between the photovoltaic generators 12 and the microcontroller 19 within the substrate 13. Typically, a p-type semiconductor layer is exposed on one face of the substrate 13, and the negative path 14 between a negative element of the photovoltaic generators 12 and the substrate 13 is achieved by the epitaxy as described above from the p-type layer of the substrate 13.

The positive path 15 is formed by a metallisation on the side of the substrate 13 and the photovoltaic generators 12, connecting a positive element 16 of the photovoltaic generators to the a positive node 17 on the non-bonded side of the substrate 13.

A base device 20 includes an input terminal 22 for coupling to a data device (not shown), a series of light transducers 24 and a collimating arrangement 26.

In operation, the input terminal 22 of the base device 20 receives a digital data signal from the data device, this digital data signal being intended for the microcontroller 19 of the smartcard. The series of light transducers 24 provide infra red (IR) radiation with a fixed nominal value but which is conventionally amplitude modulated to provide an indication of the digital data signal received from the input terminal 22.

This modulated IR radiation is then collimated by the collimating arrangement 26, where it leaves the base device 20.

The smartcard is inserted in or on the base device 20 where it is held in proximity to the collimating arrangement 26 of the base device 20. The modulated IR signal emitted from the collimating arrangement 26 is received at the smartcard, where the photovoltaic generators 12 produce a voltage signal in response to the received IR signal. This voltage signal has thus a nominal DC level, which is amplitude modulated by the digital data originally sent by the data device to the input terminal 22 of the base device 20. This voltage signal is received by the microcontroller 19 within the substrate 13 which then demodulates it by conventional techniques to derive both power and digital data signals.

In order that the microcontroller 19 may perform the demodulation and hence receive the data, it is necessary to initially send the power signal alone in order to power the microcontroller 19, before commencing data transfer.

In this way data transfer can take place between the base device 20 and the microcontroller 19 without a physical connection or a separate interface, and without the need for a separate power supply to the microcontroller.

It will be appreciated by a person skilled in the art that alternative embodiments to the one described above are possible. For example, the signal coupler could be arranged to transfer solely power or data, as opposed to the combined arrangement above.

Furthermore, it will be appreciated that an arrangement of two separate signal couplers, one for data and the other for power could be used.

Additionally, the transfer of data from the microcontroller 19 to the base station 20 is also possible using substantially the same components and operation as described above, either as an alternative arrangement, or as an additional arrangement to the one described above, so as to provide two way communication between the smartcard and the base device 20.

It will be appreciated that the photovoltaic generators 12 and microcontroller 19 may alternatively be discrete devices connected by a well known wafer bonding process.

It will also be appreciated that alternate embodiments to the one hereinbefore described may be achieved. For example, the components may be arranged to communicate in another frequency range such as the visible light spectrum or the ultra violet light spectrum instead of the IR as described above.

Additionally, an alternative method of conveying the data could be used, such as a frequency modulation or time multiplexing method.

I claim:

1. A signal coupler for incorporating in a demountable device, for use in conjunction with a base device, comprising:

optocoupling means for exchanging optical signals between the demountable device and the base device by providing voltage signals to a predetermined one of the demountable device and the base device in response to the received optical signals from the other device and for providing the optical signals to the other device in response to received voltage signals from the predetermined device, the two devices being in proximity to each other;

wherein the optocoupling means comprises a microcontroller and at least one photovoltaic generator, said at least one photovoltaic generator being fabricated by epitaxial growth on a semiconductor substrate in which said microprocessor is integrated, said semiconductor substrate incorporated in the demountable device and provides a non-contact conductive path between the demountable device and the base device.

2. The signal coupler of claim 1 wherein the signal coupler is arranged to transfer combined data and power signals via the optocoupling means between the demountable device and the base device.

3. The signal coupler of claim 2 wherein the combined data and power signals are achieved by modulating the optical signals, such that a DC portion provides the power signals and a modulated portion provides the data signals.

4. The signal coupler of claim 3 wherein said microcontroller controls the activities of the demountable device.

5. The signal coupler of claim 4 wherein a power signal is sent to power the microcontroller and hence provide control for the demountable device before the data signals are sent.

6. The signal coupler claim 5 wherein the demountable device is a smartcard.

* * * * *